Oct. 9, 1934.  G. W. BINNS ET AL  1,976,111
MACHINE TOOL
Filed June 23, 1930   2 Sheets-Sheet 1

Inventors
GEORGE W. BINNS
CLEMENT BOOTH

By *A. K. Parsons*

Attorney

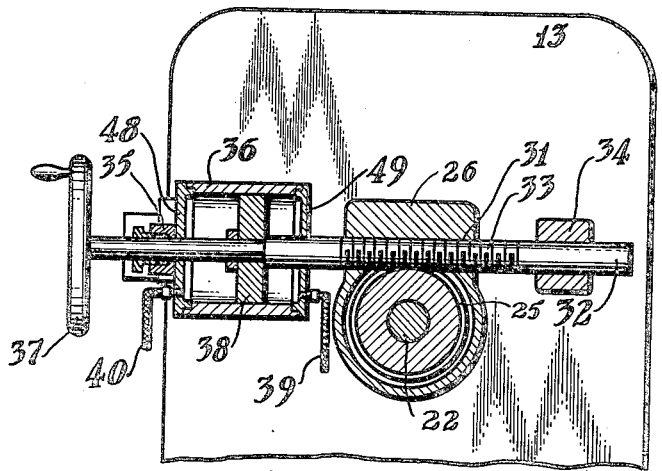
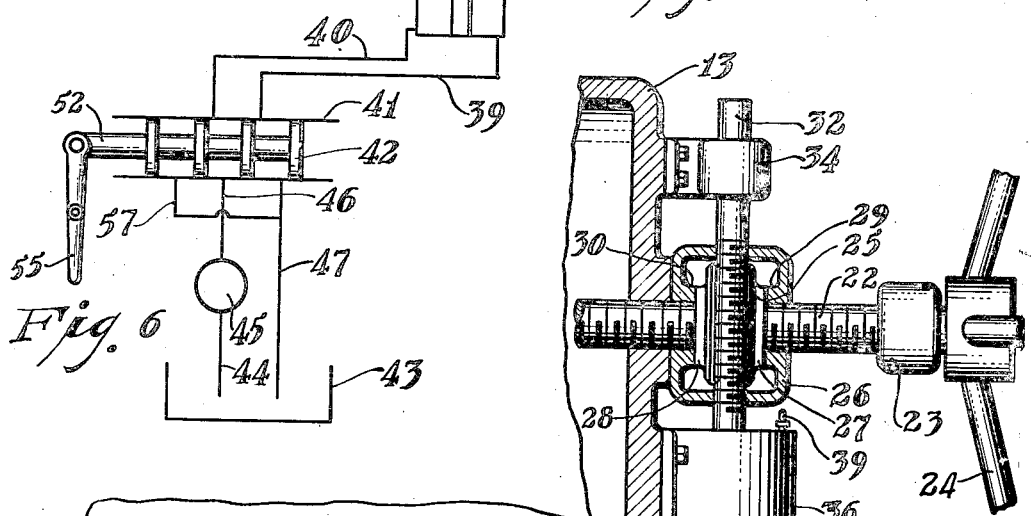
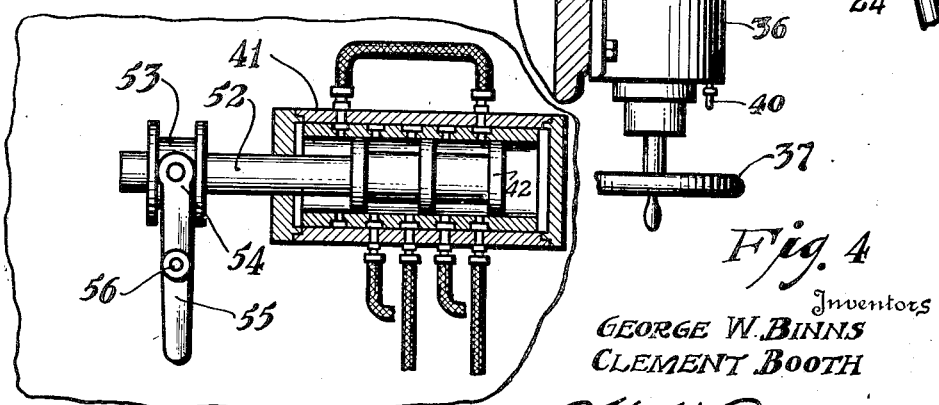

Patented Oct. 9, 1934

1,976,111

UNITED STATES PATENT OFFICE 1,976,111

MACHINE TOOL

George W. Binns and Clement Booth, Cincinnati, Ohio, assignors to Cincinnati Grinders Incorporated, Cincinnati, Ohio, a corporation of Ohio Application June 23, 1930, Serial No. 462,980

10 Claims. (Cl. 51—103)

This invention relates to improvements in machine tools and especially to such tools having a reciprocable member.

One of the objects of the present invention is the provision of improved, novel means for shifting a slide member relative to a support or the like.

Another object of the invention is the provision of a combined unitary structure for effecting the said adjustment of the slide member that may be operated hydraulically or mechanically.

A further object of the invention is the provision of a single actuating member operable from several sources of power to deliver several results to the ultimate actuable unit.

Other objects and advantages of the present invention should be readily apparent by reference to the following specification considered in conjunction with the accompanying drawings and it is to be understood that any modifications may be made in the exact structural details there shown within the scope of the appended claims without departing from or exceeding the spirit of the invention.

In the drawings:

Figure 3 is an enlarged sectional view taken on line 3—3 of Figure 1.

Figure 4 is an enlarged fragmentary sectional view taken on line 4—4 of Figure 1.

Figure 5 is a sectional view through an hydraulic valve controlling one of the sources of actuation and forming a detail of the invention.

Figure 6 is a diagrammatic view of the hydraulic circuit employed with this invention.

Throughout the several views of the drawings similar characters are employed to denote the same or similar parts.

Figure 1:
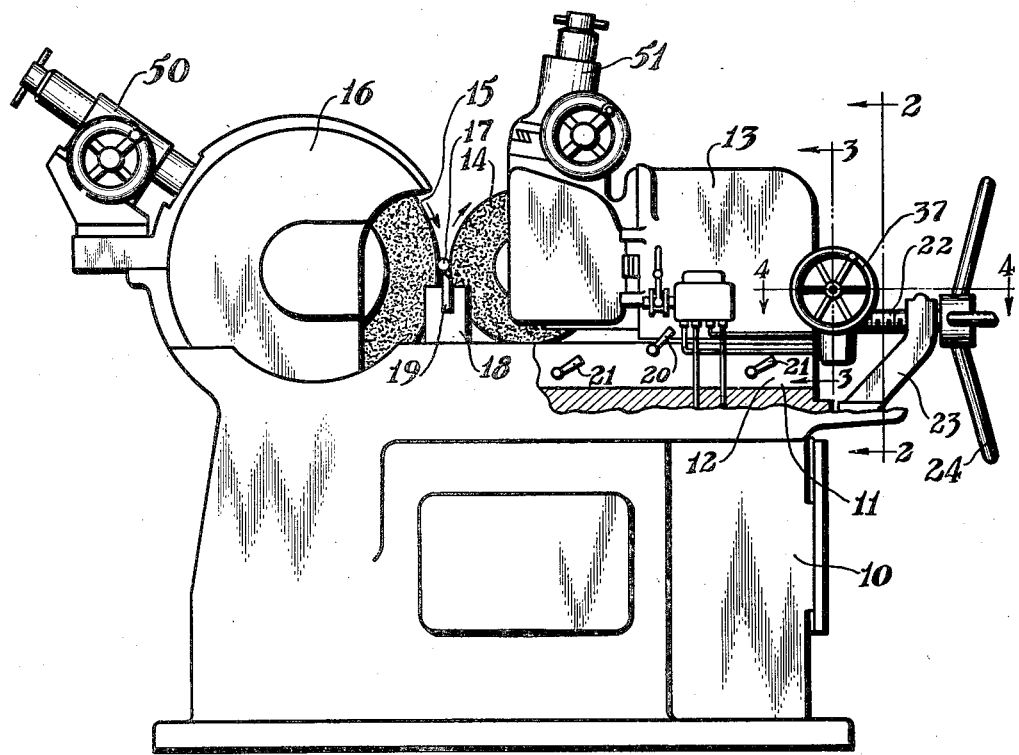
Figure 1 is a side elevation of a machine tool embodying the improvements of this invention.
Figure 2:
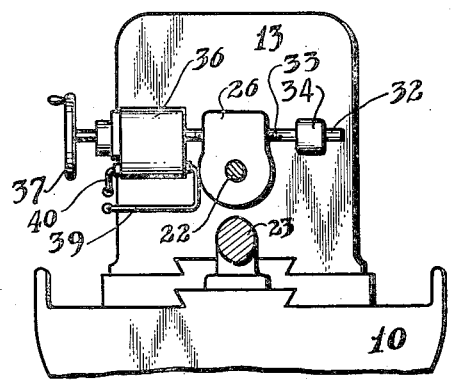
Figure 2 is a fragmentary end elevation of the device shown in Figure 1 as seen from line 2—2 thereon.

While for the purpose of illustration and description there has been chosen and described in the drawings a centerless grinder it is to be understood that any other type of machine tool having a shiftable member or unit is equally adaptable to have the improvements of this invention attached thereto. With this in mind a device of this invention may comprise a bed or support 10 having formed thereon ways 11 supporting a slide 12 adapted to be actuated longitudinally of the bed. The slide 12 in turn supports a second slide 13 bearing, in this instance, a regulating wheel 14. The regulating wheel 14 is adapted to have its face spaced a distance from the active face of a grinding wheel 15 rotatably supported by the bed 10 and enclosed within a suitable housing 16. The space between the wheels 14 and 15 forms a grinding throat in which a work piece 17 is inserted for simultaneous engagement with the said faces. The former controlling the rotation thereof while the latter effects a stock removal therefrom. As indicated by the arrows adjacent their peripheries the wheels are rotated in the same direction with their opposed surfaces traveling in opposite directions or with the surface of the grinding wheel 15 traveling downwardly while the face of the regulating wheel 14 travels upwardly. Mounted on the slide 12 and subtending the grinding throat is a block 18 supporting a work rest blade 19 upon which rests the work 17. The grinding throat is adjustable by shifting the slides 12 and 13 which may be independently adjustable or adjustable as a unit for which purpose clamps 20 and 21 are provided. The former securing the slides to one another for movement as a unit while the latter secures the lower slide 11 to the bed 10 so that slide 13 may be adjusted independently thereof. This adjustment is accomplished through an adjusting screw 22 rotatably but nontranslatably journaled in a bracket member 23 extending upwardly from the bed 10 and the screw 22 has secured thereto a hand or pilot wheel 24 for imparting rotative movement to the said screw 22. The threaded end of the screw 22 is threadedly received in a worm nut 25 supported by a bracket 26 secured to the rear wall of the slide 13 and movable therewith.

The foregoing description is characteristic of a centerless grinder as heretofore known and used. The hand or pilot wheel 24 being utilized to set up the machine for operation on a particular size or kind of work piece. In practice a terminal movement is imparted to the regulating wheel unit 13—14 for actuating same along the slide 12 to feed the work piece 17 into the grinding wheel. This invention has particular reference to the improved means for effecting said supplemental movement of the regulating wheel unit and may be applied to any of the present day existing machines.

To this end the worm nut 25 is provided on opposite sides with a thrust collar 27 and 28 engaging opposite thrust bearings 29 and 30 extending from opposite walls of the housing 26. The housing 26 in addition has a transversely formed bearing 31 in which is slidably mounted a worm or screw shaft 32. The teeth or threads 33 of the worm or screw shaft 32 mesh with complementary formed teeth or threads on the worm nut 25. The said shaft 32 is rotatably and slidably journaled at one end in a bearing 34 and at the other end in a bearing 35 extending from cylinder 36. The end of shaft 32 adjacent the bearing 35 is provided with a hand wheel 37 whereby said shaft 32 may be rotated.

From this it will be seen that a supplemental movement may be imparted to the slides 12 and 13 supplementing the movement imparted thereto by the pilot or hand wheel 24.

Secured to the shaft 32 interiorly of the cylinder 36 is a piston 38 adapted to be actuated through the cylinder by hydraulic or fluid pressure. For this purpose cylinder 36 has extending from opposite ends thereof a pipe or conduit 39 and 40 which terminates, as shown diagrammatically in Figure 6 and mechanically in Figure 5, at the casing 41 of control valve 42. The hydraulic medium is normally contained in a tank or sump 43 from which it is drawn through conduit 44 by a pump 45 and delivered under pressure through conduit 46 to the valve casing 41 and directed by valve 42 through either conduit 39 or 40, which as shown in Figure 6 is conduit 40. The medium ahead of the piston 38 is there shown as having discharged through conduit 39 to the casing 41 and directed through conduit 47 back to the tank or sump 43. This shifting of the piston 38 will longitudinally slide the worm or screw shaft 32 through its bearings 35, 31 and 34. The teeth or threads 33 thereof being in mesh with the teeth or threads of the worm nut 25 will act as a rack for rotating the said worm nut 25. Since the adjusting screw 22 is non-translatable and since the worm nut 25 is confined between thrust bearings 29 and 30 the only movement that can be imparted will be a shifting of slides 12 and 13 as a unit or of slide 13, depending upon the adjustment of clamps 20 and 21, to feed the work into the grinding wheel. The relation between the piston 38 and the walls 48 and 49 is such that when the piston is at the limit of its movement and abutting the wall 48 the throat is opened to its limit to permit the insertion and removal of work pieces and when the said piston 38 engages the wall 49 the regulating wheel unit has been actuated to its limit to feed the work into the grinding wheel and reduce the work to the correct, desired size.

From time to time it becomes necessary to true or resurface the active peripheries of the grinding and regulating wheels for which purpose truing mechanisms 50 and 51 are provided being carried respectively by the housing 16 and regulating wheel unit 13. The retruing of the wheels naturally reduces their size and consequently prevents the actuation of the wheels by the hydraulic piston 38 to reduce the throat to the desired size since the wall 49 will limit the movement of the piston. Resort is then had to the hand wheel 37 for rotating the worm or screw shaft 32 and advancing the regulating wheel unit a very small amount or an amount sufficient to correct for the amount of material removed by the truing mechanisms.

The valve 42 is provided with a valve stem 52 having secured to one end thereof a shifter spool 53 receiving the forked end 54 of a manually shiftable crank or handle 55 pivotally mounted at 56 to the wall or side of the regulating wheel unit 13. If the handle were actuated in a clockwise direction about its pivot, as seen in Figure 6, the hydraulic medium would be directed through the conduit 39 for retracting the piston 38 which piston would then discharge the medium within the cylinder 36 through the conduit 40 for direction through valve 42 to conduit 57 for conveyance to discharge conduit 47.

From the foregoing it should be understood that a combined hydraulic and mechanical improved slide or reciprocating means has been provided which combines means for normally actuating the said shiftable unit together with means for adjusting the shiftable unit to take up for wear or the like.

What is claimed is:

1. In a machine tool organization the combination of a bed or support, a slide carried thereby and movable relative thereto, a screw carried by the bed, a nut carried by the slide for threaded engagement with the screw, actuating means supported by the slide cooperating with the nut and adapted to be rotated and axially shifted to effect adjustment of the slide, and independent means for effecting the rotation and axial shifting of the actuating means.

2. In a machine tool organization the combination of a bed or support, a slide carried thereby and movable relative thereto, a screw carried by the bed, a nut carried by the slide for threaded engagement with the screw, means supported by the slide cooperating with the nut and adapted to be rotated and axially shifted to effect adjustment of the slide, and independent means for effecting the rotation and axial shifting of the actuating means, said means comprising a reciprocating hydraulic motor for effecting the axial shifting of the actuating means, and a manually operable member for rotatably actuating the said means.

3. In a machine tool organization the combination of a bed or support, a slide carried thereby and movable relative thereto, an adjusting screw carried by the bed, a nut carried by the slide in threaded engagement with the adjusting screw, a screw rack carried by the slide and operatively coupled with the nut, and independent means for axially shifting and for rotating the screw rack for actuating the nut and effecting a movement of the slide.

4. In a centerless grinder the combination of a bed, a pair of opposed grinding and regulating wheels carried thereby and forming a grinding throat therebetween, a work rest within the throat for supporting a work piece, one of said wheels being supported by a slide for movement relative to the bed toward and from the other wheel, and means for effecting said movement of the wheel slide including an adjusting screw, a nut in threaded engagement with the screw, an adjusting member carried by the slide operatively coupled with the nut, means for rotating the adjusting member to effect actuation of the nut and movement of the slide, and additional means for axially shifting the adjusting member to actuate the nut and effect a movement of the slide.

5. In a centerless grinder the combination with a bed or support, a pair of opposed grinding and regulating wheels carried thereby and forming a grinding throat therebetween, means within the throat for supporting a work piece for simultaneous engagement with the wheels, of a slide for one of the wheels movable toward and from the other wheel to feed the work piece into the grinding wheel and effect a stock removal therefrom, and means for effecting said movement of the wheel slide comprising a screw carried by the bed, a nut carried by the slide in threaded engagement with the screw, the nut having teeth formed around its periphery, means rotatably and slidably carried by the slide having complementary teeth for engagement with the peripheral teeth of the nut, and means for slidably actuating the last mentioned means to rotate the nut and adjust the slide relative to the bed.

6. In a centerless grinder the combination with a bed or support, a pair of opposed grinding and regulating wheels carried thereby and forming a grinding throat therebetween, means within the throat for supporting a work piece for simultaneous engagement with the wheels, of a slide for one of the wheels movable toward and from the other wheel to feed the work piece into the grinding wheel and effect a stock removal therefrom, and means for effecting said movement of the wheel slide comprising a screw carried by the bed, a nut carried by the slide in threaded engagement with the screw, the nut having teeth formed around its periphery, means rotatably and slidably carried by the slide having complementary teeth for engagement with the peripheral teeth of the nut, means for slidably actuating the last mentioned means to rotate the nut and adjust the slide relative to the bed, and additional means for rotating the actuating means to rotate the nut and effect a fine adjustment of the slide relative to the bed.

7. In a centerless grinder the combination with a bed or support, a pair of opposed grinding and regulating wheels carried thereby and forming a grinding throat therebetween, means within the throat for supporting a work piece for simultaneous engagement with the wheels, of a slide for one of the wheels movable toward and from the other wheel to feed the work piece into the grinding wheel and effect a stock removal therefrom, and means for effecting said movement of the wheel slide comprising a screw carried by the bed, a nut carried by the slide in threaded engagement with the screw, the nut having teeth formed around its periphery, means rotatably and slidably carried by the slide having complementary teeth for engagement with the peripheral teeth of the nut, means for slidably actuating the last mentioned means to rotate the nut and adjust the slide relative to the bed, said means including a piston secured to the actuator intermediate its ends, a cylinder for the piston carried by the slide, an hydraulic medium under pressure for reciprocating the piston through the cylinder, and means controlling the flow of the hydraulic medium.

8. In a machine tool organization the combination of a bed, a slide carried thereby and movable relative thereto, a screw carried by the bed, a nut carried by the slide in threaded engagement with the screw, an actuator rotatably and slidably carried by the slide in operative engagement with the nut for actuating same, bearings carried by the slide for the actuator, a piston on the actuator intermediate the bearings, a cylinder for the piston, an hydraulic medium for effecting a movement of the piston through the cylinder and a movement of the actuator through the piston, a conduit for the medium extending from opposite ends of the cylinder, and means in the conduit for controlling the direction of flow of the medium therethrough.

9. In a machine tool organization the combination of a bed, a slide carried thereby and movable relative thereto, a screw carried by the bed, a nut carried by the slide in threaded engagement with the screw, an actuator rotatably and slidably carried by the slide in operative engagement with the nut for actuating same, bearings carried by the slide for the actuator, a piston on the actuator intermediate the bearings, a cylinder for the piston, an hydraulic medium for effecting a movement of the piston through the cylinder and a movement of the actuator through the piston, a conduit for the medium extending from opposite ends of the cylinder, means in the conduit for controlling the direction of flow of the medium therethrough, the last mentioned means comprising a valve, a casing therefor, a stem extending from the valve beyond the casing, and manually operable means coupled with the valve stem for shifting same.

10. In a machine tool organization the combination of a bed, a slide carried thereby and movable relative thereto, a screw carried by the bed, a nut carried by the slide in threaded engagement with the screw, an actuator rotatably and slidably carried by the slide in operative engagement with the nut for actuating same, bearings carried by the slide for the actuator, a piston on the actuator intermediate the bearings, a cylinder for the piston, an hydraulic medium for effecting a movement of the piston through the cylinder and a movement of the actuator by the piston, a conduit for the medium extending from opposite ends of the cylinder, means in the conduit for controlling the direction of flow of the medium therethrough, the last mentioned means comprising a valve, a casing therefor, a stem extending from the valve beyond the casing, manually operable means coupled with the valve stem for shifting same, and manually operable means carried by the actuator for operating the nut to effect a movement of the slide supplemental to the movement thereof by the hydraulic medium.

GEORGE W. BINNS.
CLEMENT BOOTH.